(12) United States Patent
Colson et al.

(10) Patent No.: US 9,685,835 B2
(45) Date of Patent: Jun. 20, 2017

(54) MOTOR HOUSING HAVING CONICAL SHAPED ENDS WITH VARIOUS DIMENSIONAL RATIOS AND SLOPES FOR A STATOR IN AN AVIONICS CABIN AIR COMPRESSOR

(71) Applicant: Hamilton Sundstrand Corporation, Windsor Locks, CT (US)

(72) Inventors: Darryl A. Colson, West Suffield, CT (US); Murtuza Lokhandwalla, South Windsor, CT (US); Brent J. Merritt, Southwick, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 623 days.

(21) Appl. No.: 14/051,771

(22) Filed: Oct. 11, 2013

(65) Prior Publication Data

US 2015/0104301 A1   Apr. 16, 2015

(51) Int. Cl.
| | |
|---|---|
| *H02K 5/04* | (2006.01) |
| *F04D 25/06* | (2006.01) |
| *F04D 29/62* | (2006.01) |
| *H02K 15/00* | (2006.01) |
| *B64D 13/06* | (2006.01) |

(52) U.S. Cl.
CPC .......... *H02K 5/04* (2013.01); *F04D 25/0606* (2013.01); *F04D 29/624* (2013.01); *H02K 15/0006* (2013.01); *B64D 2013/0644* (2013.01); *H02K 2213/03* (2013.01); *Y02E 10/725* (2013.01); *Y02T 50/56* (2013.01)

(58) Field of Classification Search
CPC ... F04D 25/0606; F04D 29/4206; H02K 5/04; H02K 2213/03; H02K 15/0006; B64D 2013/0644; B64D 13/06
USPC .......................................................... 310/89
See application file for complete search history.

(56) References Cited

U.S. PATENT DOCUMENTS

| | | | | | |
|---|---|---|---|---|---|
| 3,321,654 | A | * | 5/1967 | Allendorph | H02K 5/04 310/216.136 |
| 3,492,517 | A | * | 1/1970 | Kuraisi | H02K 5/15 310/406 |
| 3,624,441 | A | * | 11/1971 | Todd | H02K 1/148 310/177 |
| 4,758,755 | A | * | 7/1988 | Sherman | H02K 5/22 310/402 |

(Continued)

OTHER PUBLICATIONS

EIC 2800 STIC Search Results by Scott Segal dates Jan. 4, 2016.*

(Continued)

*Primary Examiner* — Michael Andrews
*Assistant Examiner* — Maged Almawri
(74) *Attorney, Agent, or Firm* — Cantor Colburn LLP

(57) ABSTRACT

A motor housing for a cabin air compressor includes a central body portion having a center wall thickness and an internal cavity that is configured to receive an electric motor, a first end portion having a second internal cavity that is configured to receive a first end winding of the stator, and a second end portion having a third internal cavity configured to receive a second end winding of the stator. A ratio of a wall thickness of either of the first or the second end portions to the motor wall thickness is at least greater than 1.68 to 1.

11 Claims, 3 Drawing Sheets

(56) References Cited

U.S. PATENT DOCUMENTS

| | | | | | |
|---|---|---|---|---|---|
| 5,538,404 | A | * | 7/1996 | DiFlora | F04B 39/121 181/200 |
| 5,630,461 | A | * | 5/1997 | CoChimin | B22C 9/046 164/34 |
| 5,767,602 | A | * | 6/1998 | Sargeant | H02K 5/20 310/216.124 |
| 5,864,189 | A | * | 1/1999 | Kodaira | B62D 5/0403 180/444 |
| 7,014,418 | B1 | * | 3/2006 | Arnold | F01D 1/22 415/100 |
| 7,429,810 | B2 | * | 9/2008 | Ueda | H02K 3/50 310/43 |
| 8,013,489 | B2 | * | 9/2011 | Kuroda | H02K 1/17 310/154.03 |
| 2004/0012284 | A1 | * | 1/2004 | Denton | H02K 5/20 310/89 |
| 2004/0234373 | A1 | * | 11/2004 | Martin | F01D 9/026 415/206 |
| 2006/0181167 | A1 | * | 8/2006 | Bradfield | H02K 5/10 310/89 |
| 2007/0018516 | A1 | * | 1/2007 | Pal | F04D 25/082 310/61 |
| 2008/0054744 | A1 | * | 3/2008 | Fornoff | H02K 5/00 310/89 |
| 2012/0011878 | A1 | * | 1/2012 | Hipsky | B64D 13/06 62/401 |
| 2012/0014784 | A1 | * | 1/2012 | Hipsky | B64D 13/00 415/177 |
| 2012/0049668 | A1 | * | 3/2012 | Garriga | H02K 5/20 310/59 |
| 2012/0051957 | A1 | * | 3/2012 | Beers | F04D 17/12 417/423.12 |
| 2012/0064814 | A1 | * | 3/2012 | Beers | F04D 25/082 454/71 |
| 2012/0064815 | A1 | * | 3/2012 | Beers | F04D 29/057 454/71 |
| 2012/0242176 | A1 | * | 9/2012 | Pal | H02K 1/20 310/43 |
| 2013/0097996 | A1 | * | 4/2013 | Rosen | B64D 13/06 60/226.1 |
| 2013/0106219 | A1 | * | 5/2013 | Schneider | H02K 5/16 310/89 |
| 2015/0044075 | A1 | * | 2/2015 | Abe | F04B 35/04 417/349 |

OTHER PUBLICATIONS

EIC 2800 Search Report # 518573 Dated Jul. 31, 2016 by Scott Seagle.*
EIC2800 Search Report # 518573 by Scott Segal Date Jul. 13, 2016.*

* cited by examiner

MOTOR HOUSING HAVING CONICAL SHAPED ENDS WITH VARIOUS DIMENSIONAL RATIOS AND SLOPES FOR A STATOR IN AN AVIONICS CABIN AIR COMPRESSOR

BACKGROUND

The subject matter disclosed herein relates generally to aircraft environmental control and, more particularly, to a motor housing of a cabin air compressor motor for an aircraft environmental control system.

DESCRIPTION OF RELATED ART

Environmental control systems (ECSs) are utilized on various types of aircraft for several purposes, such as in cooling systems for the aircraft. For example, components of an ECS may be utilized to remove heat from various aircraft lubrication and electrical systems and/or be used to condition aircraft cabin air. A cabin air conditioner includes one or more cabin air compressors (CACs) which compress air entering the system, for an outside source or from a ram air system. The compressed air is delivered to an environmental control system to bring it to a desired temperature and delivered to the aircraft cabin. After passing through the cabin, the air is typically exhausted to the outside. CACs are typically driven by air-cooled electric motors. The electric motors include a motor stator and a motor rotor. The motor housing can be damaged if the motor stator has to be removed from the CAC assembly. A motor housing that is adequately dimensioned to reduce weight and to minimize or eliminate damage to the motor housing during replacement of the stator would be well received in the art.

BRIEF SUMMARY

According to one aspect of the invention, a motor housing for a cabin air compressor includes a central body portion having a center wall thickness and an internal cavity that is configured to receive an electric motor; a first end portion having a second internal cavity that is configured to receive a first end winding of the stator; and a second end portion having a third internal cavity configured to receive a second end winding of the stator. A ratio of a wall thickness of either of the first or the second end portions to the motor wall thickness is at least greater than 1.68 to 1.

According to another aspect of the invention, a cabin air compressor assembly includes an outlet housing coupled to an inlet housing; and a motor housing coupled to the outlet housing. The motor housing includes a central body portion having a center wall thickness and an internal cavity that is configured to receive an electric motor; a first end portion having a second internal cavity that is configured to receive a first end winding of the stator; and a second end portion having a third internal cavity configured to receive a second end winding of the stator. A ratio of a wall thickness of either of the first or the second end portions to the motor wall thickness is at least greater than 1.68 to 1.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1:
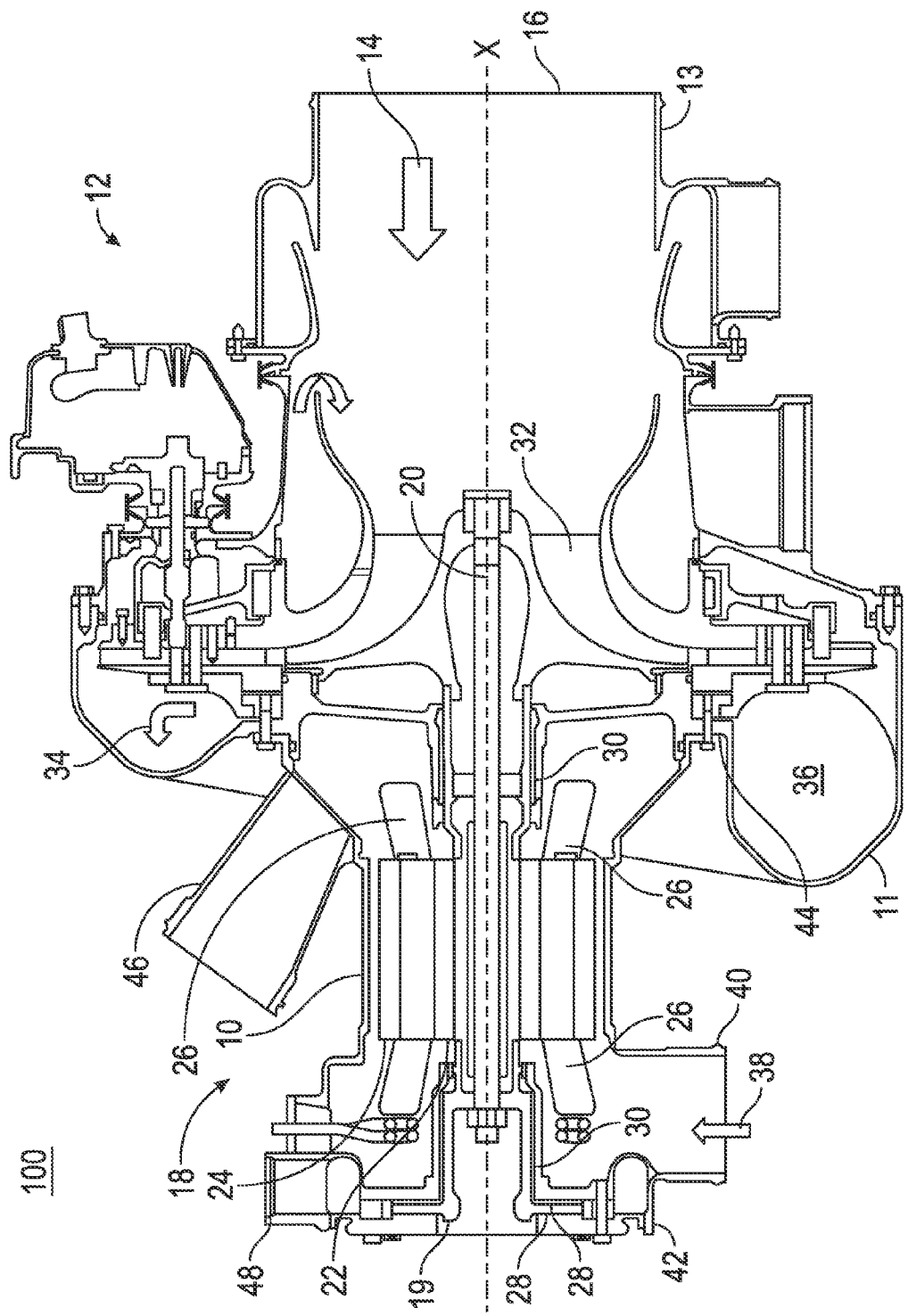
FIG. 1 is a partial cross-sectional view of a cabin air compressor assembly according to an embodiment of the invention.

Referring to the drawings, FIG. 1 is a cross-sectional view of a cabin air compressor (CAC) assembly 12 which may be used in an environmental control system 100 for an aircraft. The CAC assembly 12 compresses air flow 14 that is received at a compressor inlet 16. The CAC assembly 12 includes a motor housing 10 coupled to an outlet housing 11 and an inlet housing 13. The motor housing 10 is configured to receive a CAC motor 18 that is operably connected to a compressor rotor 32 of CAC assembly 12 via a tie rod 20 and thrust shaft 19. The thrust shaft 19 and tie rod 20 are both aligned along an axis X. The CAC motor 18 is an electric motor and includes a rotor 22 and a stator 24, which are both aligned along axis X. The rotor 22 is operably coupled to tie rod 20, which extends longitudinally through rotor 22 for rotating of a compressor rotor 32. The stator 24 is generally disposed radially outboard of rotor 22 within motor housing 10. Also, stator 24 includes a plurality of stator end windings 26 that generally extend axially from the ends of stator 24. In an embodiment, compressor rotor 32 is operably connected to tie rod 20 and is driven for rotation about an axis X by CAC motor 18. The driven compressor rotor 32 compresses an air flow 14 to provide a compressed air flow 34 at a compressor outlet 36. The CAC assembly 12 also includes one or more thrust bearings 28 and one or more journal bearings 30 to support rotation of rotor 22. To prevent overheating of the CAC motor 18, a motor cooling flow 38 is supplied via a motor cooling inlet 40 at a first end 42 of CAC motor 18. The first end 42 is directly opposite a second end 44 at which outlet housing 11 of CAC assembly 12 is disposed. The motor cooling flow 38 exits at a cooling flow outlet 46. Similarly, a bearing cooling inlet 48 supplies a cooling flow for cooling bearings 28, 30 and exits motor housing 10 through cooling flow outlet 46.

Figure 2:
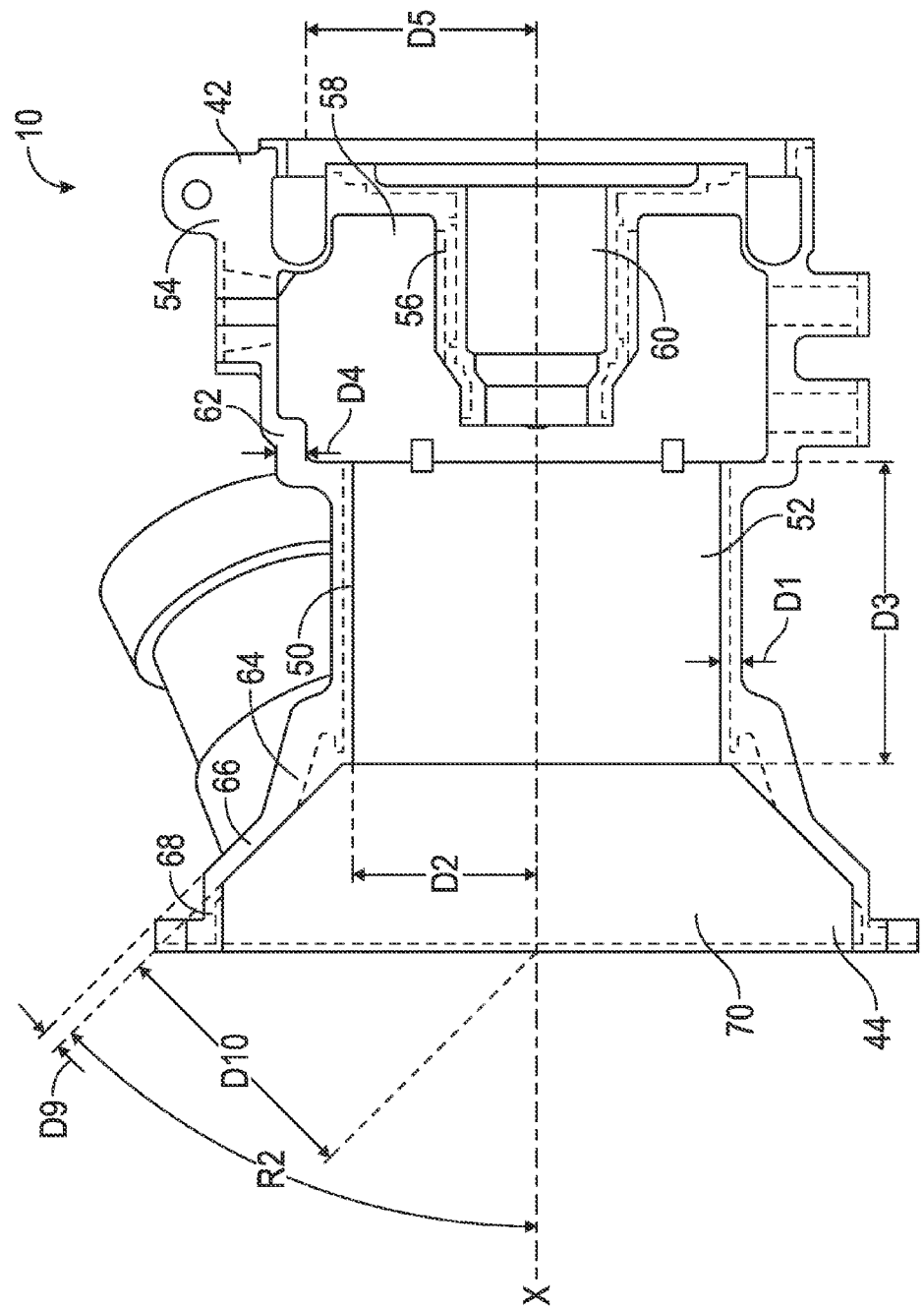
FIG. 2 is a cross-sectional view of a motor housing of the cabin air compressor assembly of FIG. 1 according to an embodiment of the invention.
Figure 3:
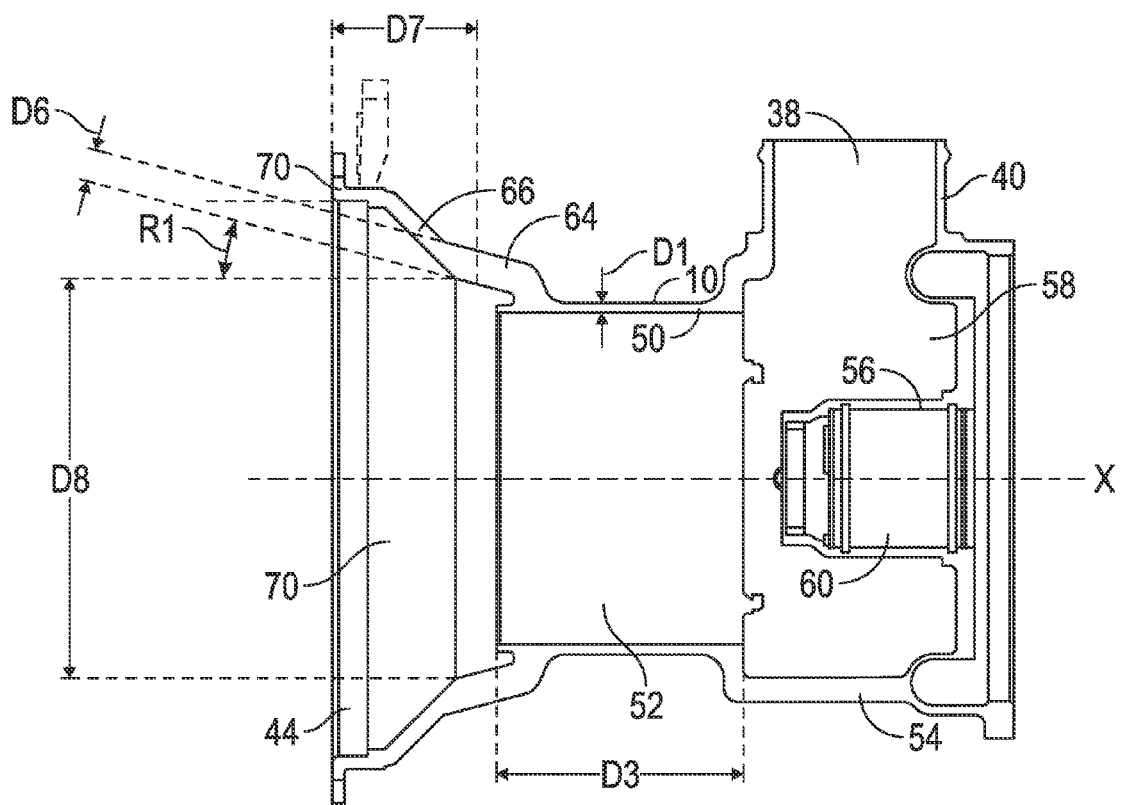
FIG. 3 is a cross-sectional view of the cabin air compressor assembly of FIG. 1 according to an embodiment of the invention.

Referring to FIGS. 2-3, a cross-sectional view of motor housing 10 of CAC motor 18 (See FIG. 1) is illustrated according to an embodiment of the invention. The motor housing 10 has a central body portion 50 that emanates and terminates at a first end 42 and at a second end 44. The first and second ends 42, 44 are configured to receive stator end windings 26 (See FIG. 1) within respective cavities. As such, in embodiments, these ends 42, 44 are configured with one or more wall thicknesses that may be slightly larger at a location immediately adjacent the stator end windings 26 than a wall thickness for a conventional motor housing in order to eliminate or minimize motor housing 10 damage during replacement of the electric motor 18 while limiting the added weight caused by the additional wall thicknesses. These embodiments will be described in relation to FIGS. 2-3.

As illustrated in the figures, central body portion 50 is generally cylindrical in shape has a center wall thickness D1. The central body portion 50 has a cavity or bore 52 that is aligned along axis X and which longitudinally traverses central body portion 50 for a longitudinal length D3. The cavity 52 has an internal radius D2 which is sized to receive at least stator 24 of CAC motor 18 (See FIG. 1). In an embodiment, center wall thickness D1 is about 0.145 inch (0.368 cm) to about 0.155 inch (0.394 cm), D2 is about 2.565 inch (6.515 cm) to about 2.605 inch (6.617 cm), and D3 is about 3.820 inch (9.703 cm) to about 3.860 inch (9.804 cm).

The first end 42 is generally tubular and includes a generally cylindrical outer wall 54 that contains a second internal cavity or bore 58, which is aligned along axis X. The second internal cavity 58 is in fluidic communication with a motor cooling flow 38 that is supplied via a motor cooling inlet 40. First end 42 also includes a generally cylindrical inner wall 56 that is concentrically disposed in the second internal cavity 58. The inner wall 54 also includes a cavity or bore 60 that traverses a longitudinal length of inner wall 56 and is aligned along axis X. The cavity 60 is configured to receive a conformally sized thrust shaft 19 (See FIG. 1). Further, outer wall 54 terminates into a generally cylindrical second outer wall 62 having a wall thickness D4 and a radius D5, which is a distance from axis X to an inner surface of outer wall 62. In embodiments, the wall thickness D4 is about 0.400 inch (1.016 cm) to about 0.440 inch (1.118 cm). In an embodiment, a ratio of the radius D5 to the outer wall thickness D4 is between 7.32 and 8.15.

The second end 44 is generally conical in shape and includes a first generally conical outer wall 64, a second generally conical outer wall 66, a generally cylindrical outer wall 68, and an orthogonal flange portion 70. First generally conical outer wall 64 has a wall thickness D6, a slope R1 (i.e., angle of wall 64 to a generally horizontal axis), a length D7 (i.e., length from a general mid-point of wall 64 to an outer face of flange portion 70), and a diameter D8 (i.e., diameter of opening from a general mid-point of wall 64). Further, first generally conical outer wall 64 terminates into a second generally conical outer wall 66 having a wall thickness D9, a slope R2, and a length D10 (i.e., distance of an inner face of wall 66 to a forty-five (45) degree conical from axis X). Outer wall 68 is generally cylindrical having an inner radius D11 and terminates into a flange portion 70 that is generally orthogonal to the outer wall 68. The outer walls 64, 66, 68 cooperate to enclose a cavity or bore 70 which is aligned along axis X. In an embodiment, wall thickness D6 is about 0.463 inch (1.176 cm) to about 0.583 inch (1.481 cm), slope R1 is about 14 degree to about 16 degree, slope R2 is about 44 degree to 46 degree, length D7 is about 2.330 inch (5.918 cm) to about 2.370 inch (6.020 cm), diameter D8 is about 6.345 inch (16.116 cm) to about 6.365 inch (16.167 cm), wall thickness D9 is about 0.260 inch (0.660 cm) to about 0.300 inch (0.762 cm), length D10 is about 3.725 inch (9.462 cm) to about 3.745 inch (9.512 cm), and radius D11 is about 4.405 inch (11.189 cm) to about 4.445 inch (11.290 cm). In an embodiment, a ratio of diameter D8 to the outer wall thickness D6 is between 10.88 and 13.75. A ratio of length D10 to outer wall thickness D9 is between 12.42 and 14.40.

A process of installing the motor housing 10 in the CAC assembly 12 includes coupling the motor housing 10 to the outlet housing 11 of the CAC assembly 12 with bolts, screws, or the like. The electric motor 18 is inserted into the motor housing 10 and the compressor rotor 32 is coupled to the tie rod 20 and thrust plate 19. The inlet housing 13 is coupled to the outlet housing 11.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. For instance, aspects of the invention are not limited to rotorcraft, and can be used in wind turbines, engine turbines, and other systems with rotary elements. Many modifications, variations, alterations, substitutions, or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description, but is only limited by the scope of the appended claims.

What is claimed is:

1. A motor housing for a cabin air compressor, comprising:
    a central body portion having a center wall thickness and an internal cavity that is configured to receive an electric motor;
    a first end portion having a second internal cavity that is configured to receive a first end winding of the stator, wherein the first end portion includes a second outer wall and a concentric inner wall that resides within the second internal cavity; and
    a second end portion having a third internal cavity configured to receive a second end winding of the stator, wherein the second end portion comprises an orthogonal flange portion, a cylindrical outer wall, a first outer conical wall having a first slope, and a second outer conical wall having a second slope;
    wherein a ratio of a wall thickness of either of the first or the second end portions to the center wall thickness is at least greater than 1.68 to 1;
    wherein a radius of the internal cavity of the center body is between 2.565 inch (6.515 cm) to 2.605 inch (6.617 cm);
    wherein a length of the first outer conical wall is between about 2.330 inch (5.918 cm) to about 2.370 inch (6.020 cm), the length of the first outer conical wall being measured from a general mid-point of the first outer conical wall to an outer face of the flange portion;
    wherein a diameter of opening from the general mid-point of the first outer conical wall is between about 6.345 inch (16.116 cm) to about 6.365 inch (16.167 cm);
    wherein a length of the second outer conical wall is between about 3.725 inch (9.462 cm) to about 3.745 inch (9.512 cm);
    wherein an inner radius of the cylindrical outer wall is between about 4.405 inch (11.189 cm) to about 4.445 inch (11.290 cm).

2. The motor housing of claim 1, wherein the first slope is between 14 degrees and 16 degrees and the second slope is between 44 degrees and 46 degrees.

3. The motor housing of claim 1, wherein the first outer conical wall comprises a first outer conical wall thickness and a ratio of the first outer conical wall thickness to the center wall thickness is between 2.99 and 4.02.

4. The motor housing of claim 1, wherein the second outer conical wall comprises a second outer conical wall thickness and a ratio of the second outer conical wall thickness to the center wall thickness is between 1.68 and 2.07.

5. The motor housing of claim 1, wherein the first end portion includes a first outer wall having a first outer wall thickness and a ratio of the first outer wall thickness to the center wall thickness is between 2.58 and 3.03.

6. The motor housing of claim 2, wherein a ratio of a radius of an internal surface of the first outer wall to the first outer wall thickness is between 7.32 and 8.15.

7. A cabin air compressor assembly, comprising:
   an outlet housing coupled to an inlet housing; and
   a motor housing coupled to the outlet housing, the motor housing comprising:
      a central body portion having a center wall thickness and an internal cavity that is configured to receive an electric motor;
      a first end portion having a second internal cavity that is configured to receive a first end winding of the stator, wherein the first end portion includes a second outer wall and a concentric inner wall that resides within the second internal cavity; and
      a second end portion having a third internal cavity configured to receive a second end winding of the stator, wherein the second end portion comprises an orthogonal flange portion, a cylindrical outer wall, a first outer conical wall having a first slope, and a second outer conical wall having a second slope;
   wherein a ratio of a wall thickness of either of the first or the second end portions to center wall thickness is at least greater than 1.68 to 1;
   wherein a radius of the internal cavity of the center body is between 2.565 inch (6.515 cm) to 2.605 inch (6.617 cm);
   wherein a length of the first outer conical wall is between about 2.330 inch (5.918 cm) to about 2.370 inch (6.020 cm), the length of the first outer conical wall being measured from a general mid-point of the first outer conical wall to an outer face of the flange portion;
   wherein a diameter of opening from the general mid-point of the first outer conical wall is between about 6.345 inch (16.116 cm) to about 6.365 inch (16.167 cm);
   wherein a length of the second outer conical wall is between about 3.725 inch (9.462 cm) to about 3.745 inch (9.512 cm);
   wherein an inner radius of the cylindrical outer wall is between about 4.405 inch (11.189 cm) to about 4.445 inch (11.290 cm).

8. The cabin air compressor assembly of claim 7, wherein the first slope is between 14 degrees and 16 degrees and the second slope is between 44 degrees and 46 degrees.

9. The cabin air compressor assembly of claim 7, wherein the first outer conical wall comprises a first outer conical wall thickness and a ratio of the first outer conical wall thickness to the center wall thickness is between 2.99 and 4.02.

10. The cabin air compressor assembly of claim 7, wherein the first end portion includes a first outer wall having a first outer wall thickness and a ratio of the first outer wall thickness to the center wall thickness is between 2.58 and 3.03.

11. The cabin air compressor assembly of claim 10, wherein a ratio of a radius of an internal surface of the first outer wall to the first outer wall thickness is between 7.32 and 8.15.

* * * * *